United States Patent [19]

Schlichte

[11] 3,872,256

[45] Mar. 18, 1975

[54] PCM TIME-DIVISION MULTIPLEX SWITCHING PROCEDURE

[75] Inventor: Max Schlichte, Munich, Germany

[73] Assignee: Siemens Aktiengesellschaft, Berlin and Munich, Germany

[22] Filed: May 18, 1973

[21] Appl. No.: 361,575

[30] Foreign Application Priority Data

May 26, 1972 Germany............................ 2225703

[52] U.S. Cl. ............................................ 179/15 AQ
[51] Int. Cl. ............................................ H04j 3/00
[58] Field of Search ...... 179/15 AQ, 15 AT, 18 AG, 179/15 A

[56] References Cited

UNITED STATES PATENTS

| | | | |
|---|---|---|---|
| 3,223,784 | 12/1965 | Inose et al. | 179/15 AQ |
| 3,504,129 | 3/1970 | Ewin et al. | 179/18 AG |
| 3,632,883 | 1/1972 | Aagaard | 179/15 AQ |

*Primary Examiner*—Kathleen H. Claffy
*Assistant Examiner*—Joseph Popek
*Attorney, Agent, or Firm*—Schuyler, Birch, Swindler, McKie & Beckett

[57] ABSTRACT

A method is disclosed for making connections through a time-space through-connection unit between incoming and outgoing time-division multiplex circuits whereby blocking of calls due to lack of capacity on a required circuit is minimized. According to the method, in a system wherein each output of the through-connection timing unit is assigned to a separate output space switching matrix, a free time channel on the outgoing time-division multiplex circuit from the switching matrix is selected as a function of the time channel of the total available time channels already seized and loaded with the least number of outgoing calls.

1 Claim, 2 Drawing Figures

PCM TIME-DIVISION MULTIPLEX SWITCHING PROCEDURE

BACKGROUND OF THE INVENTION

In telephone switching systems in which the time-division multiplex principle in applied, pulse code modulation (PCM) has gained special significance in recent years. In this type of signal modulating system, instantaneous amplitude values of the speech signal are represented by binary words, which are then transmitted in successive time intervals. The major purpose of a PCM switching system, then, resides in switching the binary words which appear on the incoming PCM time-division multiplex circuits leading to the central office, which are assigned to the individual connections, to a time channel on an outgoing PCM time-division multiplex circuit assigned to the desired individual connection. In conformity with the four-wire operation of the PCM time-division multiplex circuits entering the PCM time-division central office or outgoing therefrom, the switching is always four-wire switching; that is in carrying out the switching, the directions of transmission are to be considered separately. In so doing, the limitation in assignment of time channels is imposed that the same time channel within the particular pulse frame based on the parent-exchange pulse frame of the central office at the transmitting end is used each time for transmitting binary words to a connection over the PCM time-division multiplex circuit. This is done for purposes of engineering standardization with a view to attaining uniformity in time channels used for both directions of transmission in the individual time-division multiplex central offices (See, e.g., Proc. IEE 111 No. 12, pp. 1976 to 1980, 1976[1964]).

In accordance with the above problems which confront us in carrying out a PCM time-division multiplex switching procedure, an essential part of the switching centers used for carrying out such a procedure comprises the utilization of switching networks comprising timing circuits and spatial circuits. The timing circuits have intermediate storage devices, wherein the PCM signals are buffered during the time interval between transfer between an imcoming and an outgoing time channel. The spatial circuits comprise crosspoint switches operated cyclically and by pulses, over which incoming time-division multiplex circuits can be connected with outgoing time-division multiplex circuits. In accordance with the functional sequence of such timing or spatial circuits, various switching network structures are possible, the convenience of which depends on the conditions imposed on the switching system. Thus, for example, a space-time-space (S-T-S) system consists of an input spatial circuit followed immediately by the storage elements having outputs connected with the inputs of a second output spatial circuit. Such switching network structure has the characteristic that the centrally arranged intermediate storage elements of the timing circuit can repeatedly be utilized in the time-division multiplex system and is particularly of advantage in synchronous telecommunication networks, since no storage elements are needed therein at the input and output of the switching systems. A disadvantage of such switching network construction resides in the fact that the possible gradual expansion of such switching centers cannot be provided for economically since a minimum amount of storage must be committed in advance when the basic capacity is established. Compared to that, switching networks having a time-space (T-S) structure are more advantageous in this respect. On the input side, they have timing circuits assigned to individual lines for converting an incoming to an outgoing time channel followed immediately by the spatial switching network, whose crosspoint contacts are activated to transfer the information to the time channels to which it was assigned by means of the timing circuit. Switching networks constructed in this fashion can be expanded without difficulty and are particularly of interest for asynchronous switching systems, wherein intermediate storage elements on the input side are required for purposes of synchronization.

The problem of time channel congestion is particularly important in PCM time-division multiplex switching networks having the T-S structure, since it is highly probable that no more free timing circuit outputs can be found for time channels which are free in the spatial portion of the switching network or an outgoing PCM circuits.

It is taught with respect to a previously developed PCM time-division multiplex switching system (W. Neu and A. Kundig in Colloque International de Commutation Electronique, Paris, Mar. 28 to Apr. 6, 1966, pages 513–520), that the time-division multiplex switching network of the central office is composed of switching units (see FIG. 2), wherein any PCM circuit connected to the outputs thereof has access to any outgoing PCM circuit connected to the inputs thereof. These switching units D have a storage unit EV comprising a number of digit levels corresponding to the number of combined incoming PCM time-division multiplex circuits; the PCM data supplied by the allocated PCM time-division multiplex channels An1 to AN 16 in a pulse frame on one circuit is entered concurrently and stored after a series/parallel (SP) conversion. The readout from the storage units of said switching units takes place one after another for the individual digit levels; thus, an appropriate increase in the sampling rate is needed. Thereafter, a distribution of the data among the outgoing PCM time-division multiplex circuits takes place via a spatial switching network K. Thus, to consider one possible construction, if by means of such a switching unit, e.g., 16 PCM time-division multiplex circuits are combined, the storage units thereof have 16 digit levels, in which, depending on the number of channels within a pulse frame and on the number of bits of the PCM words transferred in a time channel, there are 32 storage locations for every 8 bits. Since in this way, in the course of a pulse frame 512 words that can be stored in the storage unit are read out one after the other, as indicated hereinabove, a 125/512 μs. interval is available for reading out an individual PCM word. Due to the increase in the sampling interval during the readout as compared to the time intervals offered during the write-in, there is freedom of blocking in this type of switching unit.

This construction of a PCM time-division multiplex switching network in the form of a single blocking-free switching unit is less than ideal, however, because of the costs which increase exponentially with the number of grouped PCM time-division multiplex circuits, and also because the increase in the sampling rate during readout from the storage unit is limited. Hence, the above time-division multiplex switching networks using blocking-free switching units are made up of a plurality of such blocking-free switching units. If timing circuits disposed in a further switching-group circuit are eliminated and these switching units are grouped together into a switching group having a T-S configuration by means of a spatial switching group section, which is of interest, due to the above mentioned expansion possibility of such switching networks, then, of course, time channel problems characteristic of switching groups having a T-S structure will reappear for the switching group as a whole.

The major purpose of the invention is, therefore, to provide a method of connecting time-division multiplex circuits by means of a time-division multiplex switching network having the structure described hereinabove, such that there is little danger of channel congestion or blocking.

SUMMARY OF THE INVENTION

The invention relates to a method of connecting time-division multiplex circuits of a time-division multiplex telecommunication system transmitting PCM signals by means of a plurality of switching units having viewed individually at least low-congestion time channels, and causing time channel conversion and spatial switching, the time switching units cooperating with a spatial switching network to form a time-division multiplex coupling array having a time-space configuration. This method according to the invention is characterized by the fact that upon the conversion of a time channel by one of the switching units, the free time channel on the outgoing time-division multiplex circuit is selected and seized in that time position in which time channels have been seized in the least degree by the relevant switching unit.

The steps advocated by the present invention bring about an equilibrium, wherein the individual time channels are employed to approximately the same degree in making connections of PCM time-division multiplex circuits. Investigation has shown that in this case there is a greater probability that subsequent connections will not be affected by time channel blocking. This is particularly important for connections in the opposite direction of the call setup, since for these connections it is no longer possible to choose from several time channels. This is caused by the fact that the same time channel within the pulse frame based on the central-office pulse frame of the switching center at the transmitting end concerned it utilized, to promote control-engineering simplification by attaining uniformity in the time channels used for both directions of transmissions in the individual time-division multiplex central offices.

BRIEF DESCRIPTION OF THE DRAWINGS

The principles of the method comprising this invention will be more readily understood by reference to the description of a preferred embodiment given hereinbelow in conjunction with the drawing, wherein.

DETAILED DESCRIPTION OF A PREFERRED EMBODIMENT

Figure 1:
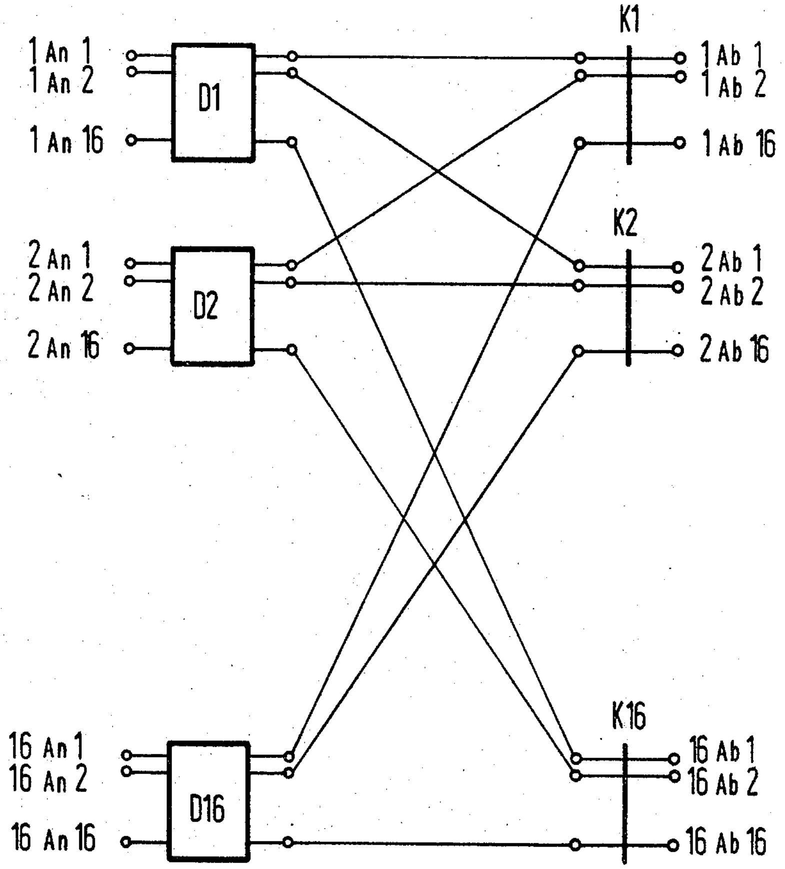
FIG. 1 is a schematic diagram of a time-division multiplex switching network of a time-division multiplex through-switching system made up of blocking-free switching units adapted for carrying out this invention.
Figure 2:
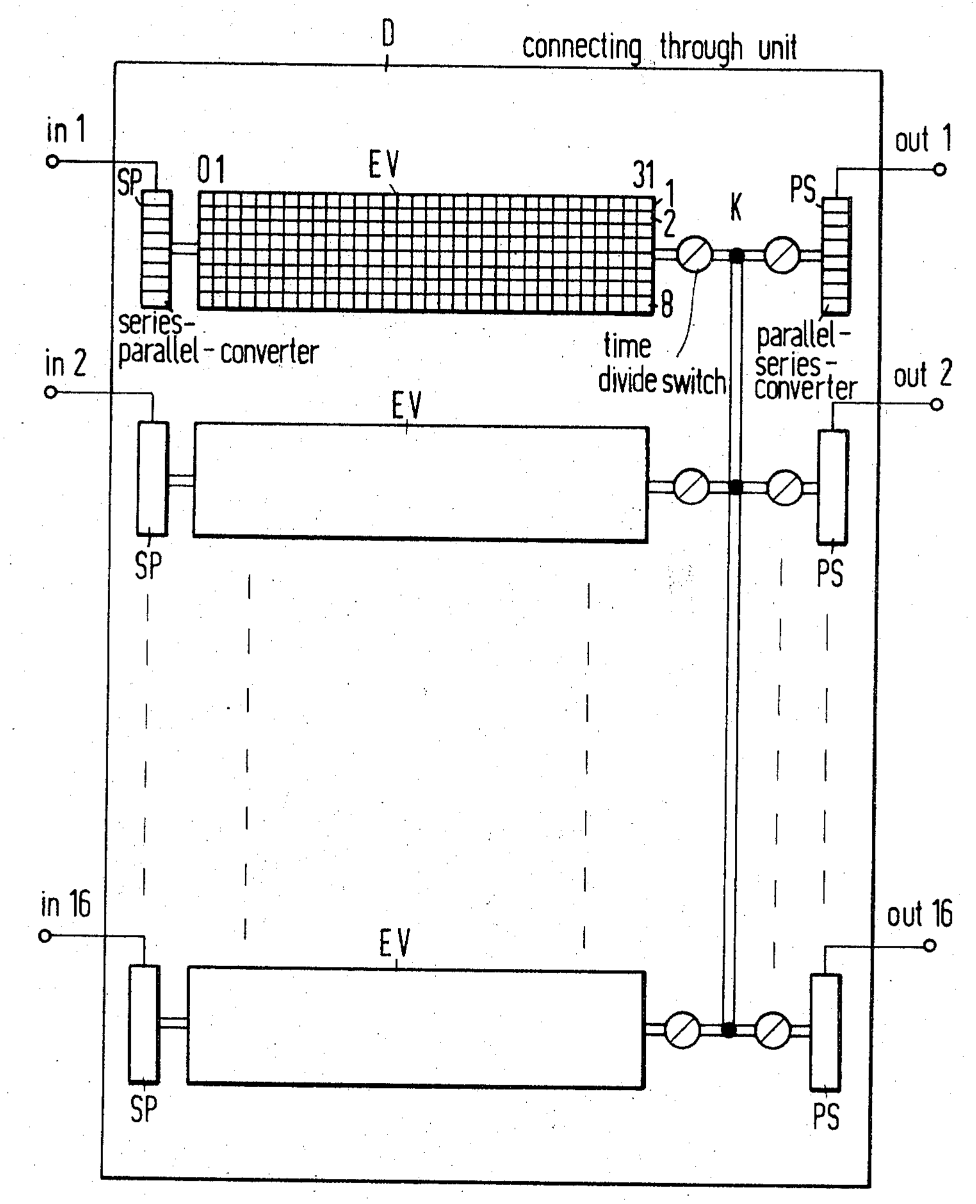
FIG. 2 shows a switching unit utilized in implementing the method of this invention in greater detail.

The PCM time-division multiplex switching network shown in FIG. 1 has 16 switching units D1 to D16, which bring about a time channel conversion as well as a spatial switching of the PCM time-division multiplex circuits connected thereto. These switching units are so operated that their time channels are free of blocking. As indicated hereinabove, this can be accomplished in that the readout from the speech storage units forming part of these switching units takes place at an increased clock frequency.

Each of these through-connecting units groups together comprises 16 incoming PCM time-division multiplex circuits An1 to An16, each of which is connected with a separate input of the through-connecting units.

Each of the outputs of the through-connecting units D1 to D16 is connected with an input each of another spatial switching matrix K1 to K6 over a link arrangement LZ as described hereinbelow. By way of example, the first output of the through-connecting unit D1 is connected with the first input of the switching matrix K1, its second output with the first input of the switching matrix K2, etc., its 16th output with the first input of the switching matrix K16.

Outgoing time-division multiplex circuits 1Ab1 to 1Ab16 are connected to the outputs of the switching matrices K1 to K16.

Since in the above described connection of the PCM time-division multiplex circuits outgoing from switching units, the incoming PCM time-division multiplex circuits grouped together by the individual switching units can be connected with more outgoing PCM time-division multiplex circuits the overall arrangement is not free from blocking, although, ideally the time channels of the individual through-connecting units should be free therefrom.

The method according to the invention reduces the danger of time-channel blocking. For purposes of illustration, let it be assumed that by means of the time-division multiplex coupling array shown, a connection is to be established between the incoming PCM time-division multiplex channel 1An1, which is connected to the through-connecting unit D1, and the outgoing PCM time-division multiplex channel 16Ab2, which is connected to an output of the switching matrix K16. Another prerequisite of course is that four time channels be idle on the outgoing PCM time-division multiplex circuit 16Ab2. Under the methods applied in the prior art for establishing transmission on the time-division multiplex circuit 16Ab2 outgoing in the direction of the call setup, the next idle time channel opposite the seized time channel on the incoming PCM time-division multiplex 1An1 in the direction of the call setup would be selected and occupied. If this process is consistently followed, the probability is great that one switching unit, in processing the seizure of many individual time channels would seize a given time channel many more times than another. In the example described the potential number of seizures can be grouped between 0 and, in this example wherein 16 PCM time-division multiplex circuits are grouped under one switching unit, 16 seizures; thus due to the above-indicated increased clock frequency, when reading out from the speech storages of these switching units in the course of a time channel, data derived from

16 different PCM time-division multiplex channels can be read out.

In carrying out the unique method of this invention, when selecting the idle time channels which are free on outgoing time-division multiplex circuits, one departs from the known switching procedure in that each time the free time channel is selected and occupied in whose time frame time channels have been seized in the lowest degree by the relevant through-connecting unit. By way of example, if on the outgoing PCM time-division multiplex circuit 16Ab2, the four time channels with the channel numbers 3, 10, 13 and 29 were idle and the time channel 3 would be seized twelve times, the time channel 10 ten times, the time channel 13 four times, and the time channel 23 nine times by the through-connecting unit D1, the time channel 13 loaded with only four seizures would then be selected and occupied in course of the setting up the call. Thus, in the individual time slots an equally large packing density is obtained. Statistical investigations have shown that, as a result, for subsequent connections to be set up through the relevant through-connecting unit and in particular for connections in the opposite direction of the call setup, for which the time channel to be seized is preassigned, this time channel can be more likely made available from the through-connecting unit by following this method, thus reducing the danger of time channel blocking.

I claim:

1. A method of selecting an outgoing time channel for permitting completion of a connection between incoming and outgoing time-division multiplex circuits transmitting PCM signals through a time division multiplex exchange installation having a plurality of through-connecting units each of which has low-congestion time channels, each of said through-connecting units including means for causing time channel conversion and spatial through-connection between said incoming and outgoing time division multiplex circuits, said through-connecting units being coupled to a spatial switching network to form a time-division multiplex coupling array with a time-space configuration, characterized by the steps of determining for the desired outgoing time-division multiplex circuit selected by the through-connecting unit the time channel of the available time channels which has previously been seized for the least number of outgoing connections, completing said outgoing connection over said channel determined to have previously been seized the least number of times.

* * * * *